(12) United States Patent
Heimel et al.

(10) Patent No.: US 11,880,369 B1
(45) Date of Patent: Jan. 23, 2024

(54) PRUNING DATA BASED ON STATE OF TOP K OPERATOR

(71) Applicant: Snowflake Inc., Bozeman, MT (US)

(72) Inventors: Max Heimel, Berlin (DE); Ismail Oukid, Berlin (DE); Linnea Passing, Berlin (DE); Stefan Richter, Berlin (DE); Juliane K. Waack, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/057,563

(22) Filed: Nov. 21, 2022

(51) Int. Cl.
*G06F 16/2455* (2019.01)
*G06F 16/2457* (2019.01)

(52) U.S. Cl.
CPC .. *G06F 16/24557* (2019.01); *G06F 16/24578* (2019.01)

(58) Field of Classification Search
CPC ............. G06F 16/9035; G06F 16/2272; G06F 16/24557; G06F 16/90344
See application file for complete search history.

(56) References Cited

U.S. PATENT DOCUMENTS

| | | |
|---|---|---|
| 4,956,774 A | 9/1990 | Shibamiya et al. |
| 6,154,572 A | 11/2000 | Chaddha |
| 6,374,232 B1 | 4/2002 | Dageville et al. |
| 6,571,233 B2 | 5/2003 | Beavin et al. |
| 6,957,225 B1 | 10/2005 | Zait et al. |
| 7,171,427 B2 | 1/2007 | Witkowski et al. |
| 7,454,418 B1 | 11/2008 | Wang et al. |
| 7,493,337 B2 | 2/2009 | Chaudhuri et al. |
| 7,814,104 B2 | 10/2010 | Raghavan et al. |
| 7,962,521 B2 | 6/2011 | Brown et al. |
| 7,970,756 B2 | 6/2011 | Beavin et al. |
| 8,209,178 B1 | 6/2012 | Talbot et al. |
| 8,458,156 B1 | 6/2013 | Sharifi et al. |
| 8,666,976 B2 | 3/2014 | Merz |
| 8,825,678 B2 | 9/2014 | Potapov et al. |

(Continued)

FOREIGN PATENT DOCUMENTS

| | | |
|---|---|---|
| CN | 113051351 A | 6/2021 |
| DE | 202020005734 U1 | 4/2022 |

(Continued)

OTHER PUBLICATIONS

US 11,397,751 B2, 07/2022, Chu et al. (withdrawn)

(Continued)

*Primary Examiner* — Robert W Beausoliel, Jr.
*Assistant Examiner* — Pedro J Santos
(74) *Attorney, Agent, or Firm* — Schwegman Lundberg & Woessner, P.A.

(57) ABSTRACT

A top K query directed at a table is received. The table is organized into multiple storage units. The top K query comprises a first clause to sort a result set in order and a second clause that specifies a limit on a number of results provided in response to the query. A table scan operator identifies a first set of rows from the table based on a scan set determined for the table and provides the first set of rows to a top K operator. The top K operator determines a current boundary based on the first set of rows and provides the current boundary to the table scan operator. The table scan operator prunes the scan set based on the current boundary and identifies a second set of rows from the table based on the pruning.

30 Claims, 8 Drawing Sheets

(56) References Cited

U.S. PATENT DOCUMENTS

| | | | |
|---|---|---|---|
| 8,887,286 B2 | 11/2014 | Dupont et al. | |
| 9,223,850 B2 | 12/2015 | Chen | |
| 9,298,726 B1 | 3/2016 | Mondal et al. | |
| 9,471,711 B2 | 10/2016 | Abadi et al. | |
| 9,507,825 B2 | 11/2016 | Baer et al. | |
| 9,514,187 B2 | 12/2016 | Ziauddin | |
| 9,684,671 B1 | 6/2017 | Dorin et al. | |
| 10,025,823 B2 | 7/2018 | Das et al. | |
| 10,311,062 B2 | 6/2019 | McPherson et al. | |
| 10,353,867 B1 | 7/2019 | Wong et al. | |
| 10,388,272 B1 | 8/2019 | Thomson et al. | |
| 10,528,599 B1 | 1/2020 | Pandis et al. | |
| 10,573,312 B1 | 2/2020 | Thomson et al. | |
| 10,628,418 B2 | 4/2020 | Weyerhaeuser et al. | |
| 10,635,671 B2 | 4/2020 | Sheng et al. | |
| 10,649,991 B2 | 5/2020 | Finlay et al. | |
| 10,685,052 B2 | 6/2020 | Winther | |
| 10,705,809 B2 | 7/2020 | Makkar | |
| 10,713,243 B2 | 7/2020 | Mathur | |
| 10,769,150 B1 | 9/2020 | Cruanes et al. | |
| 10,812,495 B2 | 10/2020 | Traore et al. | |
| 10,838,963 B2 | 11/2020 | Brodt et al. | |
| 10,860,832 B2 | 12/2020 | Wang | |
| 10,901,948 B2 | 1/2021 | Ackerman et al. | |
| 10,942,925 B1 | 3/2021 | Cruanes et al. | |
| 10,997,179 B1 | 5/2021 | Cruanes et al. | |
| 11,016,975 B1 | 5/2021 | Cruanes et al. | |
| 11,037,258 B2 | 6/2021 | Brenner et al. | |
| 11,042,650 B2 | 6/2021 | Fu et al. | |
| 11,074,261 B1 | 7/2021 | Pandis et al. | |
| 11,086,875 B2 | 8/2021 | Cruanes et al. | |
| 11,113,286 B2 | 9/2021 | Cruanes et al. | |
| 11,163,745 B2 | 11/2021 | Coleman et al. | |
| 11,176,133 B2 | 11/2021 | Horn et al. | |
| 11,194,793 B1 | 12/2021 | Srivastava et al. | |
| 11,308,089 B2 | 4/2022 | Cruanes et al. | |
| 11,308,090 B2 | 4/2022 | Allahverdiyev et al. | |
| 11,321,325 B2 | 5/2022 | Cruanes et al. | |
| 11,372,860 B2 | 6/2022 | Heimel et al. | |
| 2004/0243816 A1 | 12/2004 | Hacigumus et al. | |
| 2005/0120004 A1 | 6/2005 | Stata et al. | |
| 2005/0198076 A1 | 9/2005 | Stata et al. | |
| 2007/0250476 A1* | 10/2007 | Krasnik | G06F 16/2246 |
| 2008/0294696 A1 | 11/2008 | Frandzel | |
| 2009/0070303 A1* | 3/2009 | Beavin | G06F 16/24557 |
| 2009/0100055 A1 | 4/2009 | Wang | |
| 2010/0125594 A1 | 5/2010 | Li et al. | |
| 2010/0281017 A1 | 11/2010 | Hu et al. | |
| 2010/0318519 A1 | 12/2010 | Hadjieleftheriou et al. | |
| 2011/0213775 A1 | 9/2011 | Franke et al. | |
| 2012/0109888 A1 | 5/2012 | Zhang et al. | |
| 2013/0166553 A1 | 6/2013 | Yoon et al. | |
| 2013/0166557 A1 | 6/2013 | Fricke et al. | |
| 2013/0346720 A1 | 12/2013 | Colgrove et al. | |
| 2014/0095502 A1* | 4/2014 | Ziauddin | G06F 16/285 707/E17.046 |
| 2014/0114942 A1 | 4/2014 | Belakovskiy et al. | |
| 2014/0154352 A1 | 6/2014 | Altonen et al. | |
| 2014/0201126 A1 | 7/2014 | Zadeh et al. | |
| 2014/0223565 A1 | 8/2014 | Cohen | |
| 2014/0365424 A1 | 12/2014 | Herbst et al. | |
| 2015/0134670 A1 | 5/2015 | Liu et al. | |
| 2015/0254338 A1 | 9/2015 | Cheluvaraja et al. | |
| 2015/0269934 A1 | 9/2015 | Biadsy et al. | |
| 2015/0286681 A1 | 10/2015 | Baer et al. | |
| 2015/0286682 A1* | 10/2015 | Ziauddin | G06F 16/24542 707/718 |
| 2016/0026667 A1 | 1/2016 | Mukherjee et al. | |
| 2016/0162364 A1 | 6/2016 | Mutha et al. | |
| 2016/0188623 A1 | 6/2016 | Finlay et al. | |
| 2016/0196306 A1 | 7/2016 | Beavin et al. | |
| 2016/0292201 A1 | 10/2016 | Asaad et al. | |
| 2016/0350347 A1 | 12/2016 | Das et al. | |
| 2016/0350375 A1 | 12/2016 | Das et al. | |
| 2016/0350392 A1 | 12/2016 | Rice et al. | |
| 2017/0031975 A1 | 2/2017 | Mishra et al. | |
| 2017/0031976 A1 | 2/2017 | Chavan et al. | |
| 2017/0060944 A1 | 3/2017 | Khayyat et al. | |
| 2017/0109295 A1 | 4/2017 | Lasperas et al. | |
| 2017/0116136 A1 | 4/2017 | Macnicol et al. | |
| 2017/0116271 A1 | 4/2017 | Ziauddin et al. | |
| 2017/0139989 A1 | 5/2017 | Weyerhaeuser et al. | |
| 2017/0220652 A1 | 8/2017 | Kazi et al. | |
| 2017/0300862 A1 | 10/2017 | Bhadouria et al. | |
| 2018/0052904 A1 | 2/2018 | Fusco et al. | |
| 2018/0068008 A1 | 3/2018 | Cruanes et al. | |
| 2018/0101540 A1 | 4/2018 | Stoop et al. | |
| 2018/0113889 A1 | 4/2018 | Brodt | |
| 2018/0275982 A1 | 9/2018 | Hunt et al. | |
| 2018/0285418 A1 | 10/2018 | Petropoulos et al. | |
| 2018/0307857 A1 | 10/2018 | Beecham et al. | |
| 2018/0336263 A1 | 11/2018 | Bensberg et al. | |
| 2018/0357262 A1 | 12/2018 | He et al. | |
| 2019/0102441 A1 | 4/2019 | Malak et al. | |
| 2019/0130250 A1 | 5/2019 | Park et al. | |
| 2019/0205376 A1 | 7/2019 | Merhav et al. | |
| 2019/0220464 A1 | 7/2019 | Butani | |
| 2019/0294615 A1 | 9/2019 | Plattner et al. | |
| 2019/0303270 A1 | 10/2019 | Hoermann | |
| 2019/0332722 A1 | 10/2019 | Ogren et al. | |
| 2019/0370241 A1 | 12/2019 | Miraldo et al. | |
| 2020/0026788 A1 | 1/2020 | Bellamkonda et al. | |
| 2020/0117546 A1 | 4/2020 | Wong et al. | |
| 2020/0125674 A1 | 4/2020 | Arunski et al. | |
| 2020/0175961 A1 | 6/2020 | Thomson et al. | |
| 2020/0184278 A1 | 6/2020 | Zadeh et al. | |
| 2020/0285761 A1 | 9/2020 | Buck et al. | |
| 2020/0373946 A1 | 11/2020 | Lee et al. | |
| 2021/0073219 A1 | 3/2021 | Barbas et al. | |
| 2021/0200772 A1 | 7/2021 | Cruanes et al. | |
| 2021/0216555 A1 | 7/2021 | Cruanes et al. | |
| 2021/0271644 A1 | 9/2021 | Chinthekindi et al. | |
| 2021/0319025 A1 | 10/2021 | Cruanes et al. | |
| 2021/0357411 A1 | 11/2021 | Cruanes et al. | |
| 2021/0365461 A1 | 11/2021 | Allahverdiyev et al. | |
| 2021/0397619 A1 | 12/2021 | Heimel et al. | |
| 2022/0012246 A1 | 1/2022 | Oukid et al. | |
| 2022/0012247 A1 | 1/2022 | Oukid et al. | |
| 2022/0207041 A1 | 6/2022 | Allahverdiyev et al. | |
| 2022/0215026 A1 | 7/2022 | Su et al. | |
| 2022/0215027 A1 | 7/2022 | Cruanes et al. | |
| 2022/0277013 A1 | 9/2022 | Cruanes et al. | |
| 2022/0284025 A1 | 9/2022 | Adams et al. | |
| 2022/0292098 A1 | 9/2022 | Heimel et al. | |
| 2023/0034257 A1* | 2/2023 | Bei | G06F 16/24553 |

FOREIGN PATENT DOCUMENTS

| | | | |
|---|---|---|---|
| EP | 2434417 A1 | 3/2012 | |
| WO | WO-2021/133433 A1 | 7/2021 | |
| WO | WO-2022/016170 A1 | 1/2022 | |

OTHER PUBLICATIONS

"U.S. Appl. No. 16/727,315, Examiner Interview Summary dated Jun. 2, 2020", 3 pgs.

"U.S. Appl. No. 16/727,315, Non-Final Office Action dated Mar. 2, 2020", 12 pgs.

"U.S. Appl. No. 16/727,315, Notice of Allowance dated Jun. 8, 2020", 9 pgs.

"U.S. Appl. No. 16/727,315, Response Filed May 27, 2020 to Non-Final Office Action dated Mar. 2, 2020", 14 pgs.

"U.S. Appl. No. 16/932,462, Examiner Interview Summary dated Nov. 25, 2020", 3 pgs.

"U.S. Appl. No. 16/932,462, Non-Final Office Action dated Aug. 21, 2020", 11 pgs.

"U.S. Appl. No. 16/932,462, Notice of Allowance dated Dec. 15, 2020", 9 pgs.

"U.S. Appl. No. 16/932,462, Response filed Nov. 23, 2020 to Non-Final Office Action dated Aug. 21, 2020", 12 pgs.

"U.S. Appl. No. 17/086,228, Non-Final Office Action dated Dec. 28, 2020", 12 pgs.

(56) References Cited

OTHER PUBLICATIONS

"U.S. Appl. No. 17/086,228, Notice of Allowance dated Jan. 22, 2021", 7 pgs.

"U.S. Appl. No. 17/086,228, Response filed Jan. 4, 2021 to Non-Final Office Action dated Dec. 28, 2020", 8 pgs.

"U.S. Appl. No. 17/086,239, Non-Final Office Action dated Dec. 17, 2020", 15 pgs.

"U.S. Appl. No. 17/086,239, Notice of Allowance dated Apr. 9, 2021", 15 pgs.

"U.S. Appl. No. 17/086,239, Response filed Mar. 17, 2021 to Non-Final Office Action dated Dec. 17, 2020", 12 pgs.

"U.S. Appl. No. 17/161,115, Corrected Notice of Allowability dated Jun. 24, 2021", 2 pgs.

"U.S. Appl. No. 17/161,115, Final Office Action dated Apr. 28, 2021", 17 pgs.

"U.S. Appl. No. 17/161,115, Non-Final Office Action dated Mar. 23, 2021", 19 pgs.

"U.S. Appl. No. 17/161,115, Notice of Allowance dated May 12, 2021", 8 pgs.

"U.S. Appl. No. 17/161,115, Response filed Apr. 15, 2021 to Non-Final Office Action dated Mar. 23, 2021", 12 pgs.

"U.S. Appl. No. 17/161,115, Response filed Apr. 30, 2021 to Final Office Action dated Apr. 28, 2021", 8 pgs.

"U.S. Appl. No. 17/218,962, Corrected Notice of Allowability dated Jul. 12, 2021", 2 pgs.

"U.S. Appl. No. 17/218,962, Non-Final Office Action dated Jun. 4, 2021", 21 pgs.

"U.S. Appl. No. 17/218,962, Notice of Allowance dated Jul. 2, 2021", 8 pgs.

"U.S. Appl. No. 17/218,962, Response filed Jun. 10, 2021 to Non-Final Office Action dated Jun. 4, 2021", 9 pgs.

"U.S. Appl. No. 17/358,154, Corrected Notice of Allowability dated Mar. 2, 2022", 2 pgs.

"U.S. Appl. No. 17/358,154, Non-Final Office Action dated Oct. 20, 2021", 24 pgs.

"U.S. Appl. No. 17/358,154, Notice of Allowance dated Feb. 14, 2022", 9 pgs.

"U.S. Appl. No. 17/358,154, Response filed Jan. 17, 2022 to Non-Final Office Action dated Oct. 20, 2021", 11 pgs.

"U.S. Appl. No. 17/388,160, Non-Final Office Action dated Dec. 6, 2021", 24 pgs.

"U.S. Appl. No. 17/388,160, Notice of Allowance dated Mar. 2, 2022", 10 pgs.

"U.S. Appl. No. 17/388,160, Response filed Jan. 28, 2022 to Non-Final Office Action dated Dec. 6, 2021", 10 pgs.

"U.S. Appl. No. 17/394,149, Non-Final Office Action dated Dec. 13, 2021", 18 pgs.

"U.S. Appl. No. 17/394,149, Notice of Allowance dated Feb. 18, 2022", 9 pgs.

"U.S. Appl. No. 17/394,149, Response filed Jan. 28, 2022 to Non Final Office Action dated Dec. 13, 2021", 10 pgs.

"U.S. Appl. No. 17/462,796, Examiner Interview Summary dated Mar. 22, 2022", 2 pgs.

"U.S. Appl. No. 17/462,796, Non-Final Office Action dated Dec. 21, 2021", 18 pgs.

"U.S. Appl. No. 17/462,796, Notice of Allowance dated Apr. 20, 2022", 8 pgs.

"U.S. Appl. No. 17/462,796, Response filed Mar. 21, 2022 to Non-Final Office Action dated Dec. 21, 2021", 12 pgs.

"U.S. Appl. No. 17/484,817, Corrected Notice of Allowability dated Jan. 20, 2022", 2 pgs.

"U.S. Appl. No. 17/484,817, Non-Final Office Action dated Oct. 29, 2021", 35 pgs.

"U.S. Appl. No. 17/484,817, Notice of Allowance dated Jan. 11, 2022", 10 pgs.

"U.S. Appl. No. 17/484,817, Response filed Nov. 30, 2021 to Non-Final Office Action dated Oct. 29, 2021", 10 pgs.

"U.S. Appl. No. 17/486,426, Non-Final Office Action dated Nov. 22, 2021", (16 pgs.).

"U.S. Appl. No. 17/486,426, Notice of Allowance dated Dec. 27, 2021", 9 pgs.

"U.S. Appl. No. 17/486,426, Response filed Nov. 30, 2021 to Non Final Office Action dated Nov. 22, 2021", 10 pgs.

"U.S. Appl. No. 17/655,124, Non-Final Office Action dated May 4, 2022", 14 pgs.

"U.S. Appl. No. 17/655,124, Notice of Allowance dated Aug. 3, 2022", 9 pgs.

"U.S. Appl. No. 17/655,124, Response filed Jul. 19, 2022 to Non-Final Office Action dated May 4, 2022", 10 pgs.

"U.S. Appl. No. 17/657,019, Non-Final Office Action dated May 24, 2022", 17 pgs.

"U.S. Appl. No. 17/657,019, Notice of Allowance dated Sep. 9, 2022", 10 pgs.

"U.S. Appl. No. 17/657,019, Response filed Aug. 17, 2022 to Non Final Office Action dated May 24, 2022", 11 pgs.

"U.S. Appl. No. 17/804,630, Non-Final Office Action dated Jul. 14, 2022", 14 pgs.

"U.S. Appl. No. 17/804,630, Response filed Sep. 29, 2022 to Non-Final Office Action dated Jul. 14, 2022", 10 pgs.

"European Application Serial No. 20216097.4, Extended European Search Report dated May 20, 2021", 7 pgs.

"European Application Serial No. 20216097.4, Response filed Dec. 22, 2021 to Extended European Search Report dated May 20, 2021", 32 pgs.

"Indian Application Serial No. 202044053756, First Examination Report dated Dec. 21, 2021", 6 pgs.

"Indian Application Serial No. 202044053756, Response filed Jun. 21, 2022 to First Examination Report dated Dec. 21, 2021", 31 pgs.

"International Application Serial No. PCT/US2020/044199, International Preliminary Report on Patentability dated Jul. 7, 2022", 8 pgs.

"International Application Serial No. PCT/US2020/044199, International Search Report dated Aug. 26, 2020", 2 pgs.

"International Application Serial No. PCT/US2020/044199, Written Opinion dated Aug. 26, 2020", 6 pgs.

"International Application Serial No. PCT/US2021/070808, International Search Report dated Jul. 26, 2021", 2 pgs.

"International Application Serial No. PCT/US2021/070808, Written Opinion dated Jul. 26, 2021", 3 pgs.

"Korean Application Serial No. 10-2021-7031021, Notice of Preliminary Rejection dated Jul. 20, 2022", (w/ English Translation), 13 pgs.

\* cited by examiner

PRUNING DATA BASED ON STATE OF TOP K OPERATOR

TECHNICAL FIELD

Embodiments of the disclosure relate generally to cloud data platforms and, more specifically, to pruning data while processing a query based on a state of a top K operator.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
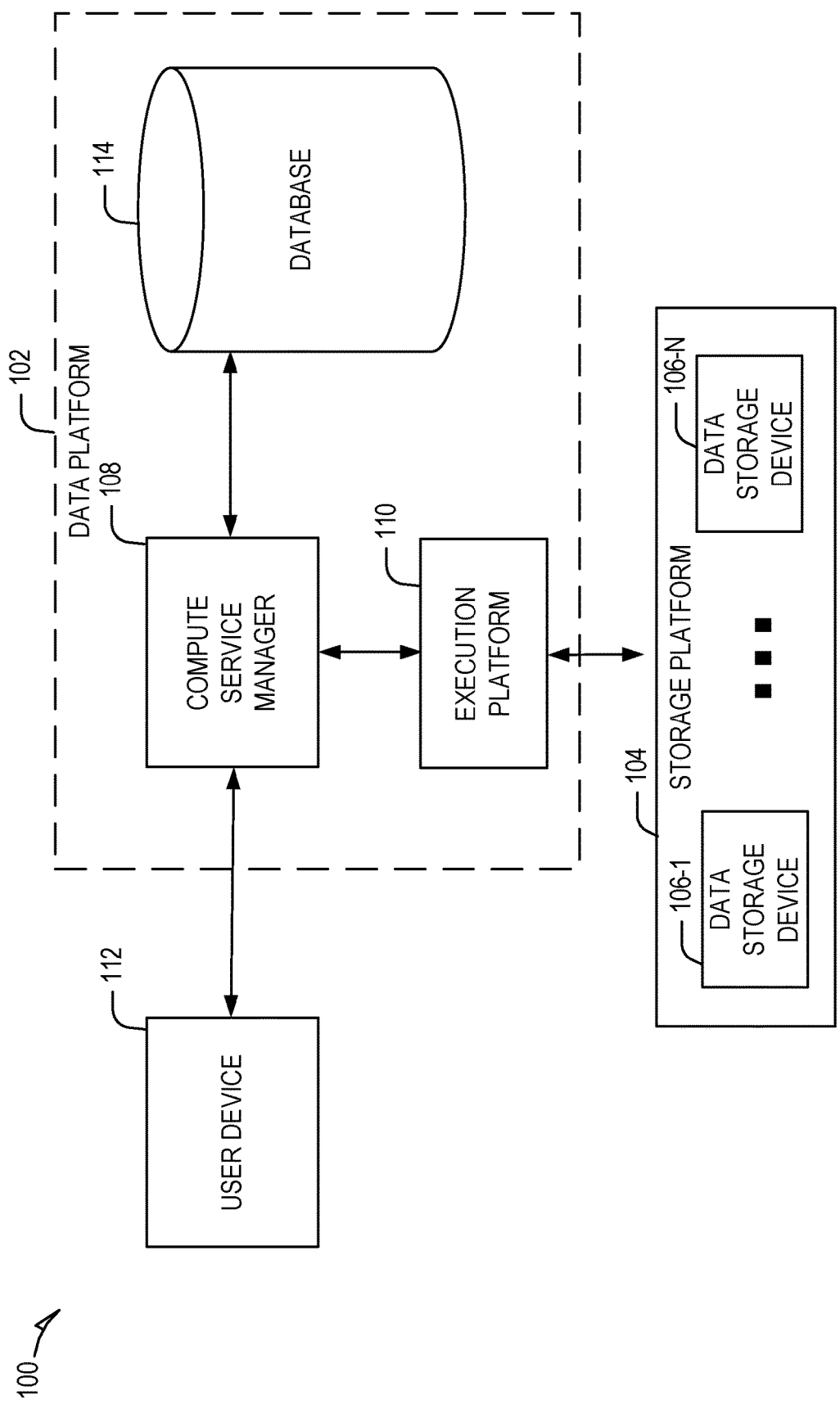
FIG. 1 illustrates an example computing environment that includes a cloud data platform in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, it can be challenging to execute queries on a very large table because a significant amount of time and computing resources are required to scan an entire table to identify data that satisfies the query. To avoid scanning an entire table, a process known as "pruning" is often performed as part of processing queries. Pruning involves using metadata to determine which portions of a table are not pertinent to a query, avoiding those non-pertinent portions when responding to the query, and scanning only the pertinent portions to respond to the query. Metadata may be automatically gathered about all rows stored in a given portion of the table, including: a maximum and minimum value for each of the columns in the portion; a number of distinct values; and/or additional properties used for both optimization and efficient query processing.

A given table may be organized as records (e.g., rows or a collection of rows) that each include one or more attributes (e.g., columns). A data platform may physically store database data (e.g., a table) in multiple storage units, which may be referred to as partitions, micro-partitions, and/or by one or more other names. In an example, multiple storage units of a database can be stored in a block and multiple blocks can be grouped into a single file. That is, a database can be organized into a set of files where each file includes a set of blocks where each block includes a set of more granular storage units such as partitions. Consistent with this example, for a given column, all blocks are stored contiguously and blocks for different columns are row aligned. Data stored in each block can be compressed to reduce its size. A block storing compressed data may also be referred to as a "compression block" herein. Accordingly, pruning may include determining which files, blocks, partitions, micro-partitions or other storage units of a table are not pertinent to a query. It should be understood that the terms "row" and "column" are used for illustration purposes and these terms are interchangeable. Data arranged in a column of a table can similarly be arranged in a row of the table.

A "top K query" refers to a query statement that includes a first clause to sort results of query (also referred to herein as a "result set") in ascending or descending order (e.g., an ORDER BY clause in structured query language (SQL)) and a second clause that limits the result set to a specific number of results (e.g., a LIMIT or LIMIT OFFSET clause in SQL), which is denoted herein as K. Hence, a "top K query" specifies that the result set includes a K number of results in ascending or descending order.

A conventional approach to processing top K queries involves execution of a query plan that includes at least a table scan operator and a top K operator. Generally, the table scan operator scans portions of a table to identify values that may satisfy the query and the table scan operator provides the values to the top K operator for further processing that includes sorting and filtering based on the first and second clauses. The portions of the table scanned by the table scan operator are referred to as the "scan set" and may, for some embodiments, include one or more micro-partitions or one or more micro-partitions groupings, or other more or less granular portions of the table. In processing rows received from the table scan operator, the top K operator determines a current boundary that it uses to filter rows received from the table scan operator. The current boundary may comprise one or more boundary values. For example, once the top K operator has seen K rows, it knows that any row that would be placed behind the Kth row given the sorted order will not be a part of the top K rows and as such, these rows are discarded (filtered). Whenever the top K operator identifies a row that would come before the current boundary (corresponding to the last row of the K rows stored in the operator given the ordering), this previous last row is discarded and the current boundary is updated to the new last row of the K rows stored by the operator.

Conventionally, the table scan operator does not receive or process any runtime information from the top K operator. Although the table scan operator may prune the scan set and filter its own output before providing it to the top K operator, it does so using only information known prior to initiation of the table scan. Thus, with this conventional approach, the table scan operator may identify rows and send them to the top K operator that the top K operator may immediately discard via filtering using the current boundary.

Aspects of the present disclosure include a data platform, systems, methods, and devices that improve upon conventional processing of top K queries by enabling the table scan operator to access runtime information from the top K operator for use in pruning and filtering at an earlier point in the query execution. Unlike conventional top K query processing techniques in which information is only sent to downstream operators at runtime, with the approach to processing top K queries utilized by the data platform described herein, the table scan operator continuously receives information about the current boundary from the downstream top K operator in the same pipeline and the quality of this information improves with the amount of data the top K operator has processed. This means that the table scan operator updates its pruning and filtering information while it is running, which is contrary to conventional approaches, and portions of the table that are processed later will be pruned and/or filtered more selectively than previous ones.

Pruning using the current boundary used by the top K operator reduces the amount of data the table scan operator needs to load and filter while also reducing the amount of data the table scan operator sends to the next operator. Processing top K queries in this manner reduces the processing performed by the table scan operators as well as the processing performed by the top K operator because the top K operator has fewer rows to process. Thus, this approach to processing top K queries increases the speed of query execution by the data platform relative to data platforms that use conventional approaches to processing top K queries. Also, in addition to reducing the work of the table scan operator itself, the reduction in output of the table scan operator reduces the number of rows that intervening operators, in between the table scan operator and top K operator, have to process.

FIG. 1 illustrates an example computing environment 100 that includes a data platform 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the data platform 102 and the storage platform 104 (e.g., AWS®, Microsoft Azure Blob Storage °, or Google Cloud Storage®). The data platform 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the data platform 102.

The data platform 102 comprises a compute service manager 108, an execution platform 110, and a database 114. The data platform 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the data platform 102. In some embodiments, the compute service manager 108 does not receive any direct communications from the user device 112 and only receives communications concerning jobs from a queue within the data platform 102.

The compute service manager 108 is also coupled to database 114, which is associated with the data stored in the computing environment 100. The database 114 stores metadata pertaining to various functions and aspects associated with the data platform 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include metadata that includes information about data stored in the table such as minimum and maximum values stored in particular portions of the table. For example, as noted above, a table may be organized into multiple granular storage units such as micro-partitions. The multiple storage units may be stored (e.g., as files) across multiple blocks (or compression blocks). That is, a block may comprise a set of storage units (e.g., partitions or micro-partitions) and the set of storage units may be a subset of the multiple storage units into which the table is organized. The metadata associated with the table may specify a minimum and maximum value for each storage unit as well as each block. The metadata stored in the database 114 can be used by one or more components of the data platform 102 to perform pruning during query processing. That is, given a query directed at a table organized into storage units (e.g., a set of micro-partitions), one or more components of the data platform 102 can use the metadata to identify a reduced set of storage units to scan in executing the query. The set of storage units to scan in executing a query may be referred to herein as a "scan set."

The compute service manager 108 is further coupled to the execution platform 110, which provides multiple computing resources that execute various data storage and data retrieval tasks. The execution platform 110 comprises a plurality of compute nodes. A set of processes on a compute node executes at least a portion of a query plan compiled by the compute service manager 108. As an example, the compute service manager 108 may generate a query plan for an incoming top K query that includes at least a table scan operator and a top K operator, though the query plan may include additional upstream, downstream, or intervening operators, depending on the query. The query plan may be embodied in computer-readable instructions for execution by one or more execution nodes of the execution platform 110. That is, the computer-readable instructions may configure any one or more of the execution nodes of the execution platform 110 to be or include any one or more of the table scan operator and the top K operator. The table scan operator scans a scan set from the table to which the top K query is directed to identify rows that may satisfy the top K query and the table scan operator provides the identified rows to the top K operator. The top K operator is responsible for sorting and filtering rows received from the table scan operator and in doing so the top K operator determines and continuously updates a current boundary for filtering rows. The table scan operator continuously receives information about the current boundary (including one or more boundary values) from the downstream top K operator and the table scan operator uses the information to prune the scan set and filter rows identified from the scan set.

The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the data platform 102. Thus, in the described embodiments, the data platform 102 is dynamic and supports regular changes to meet the current data processing needs.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
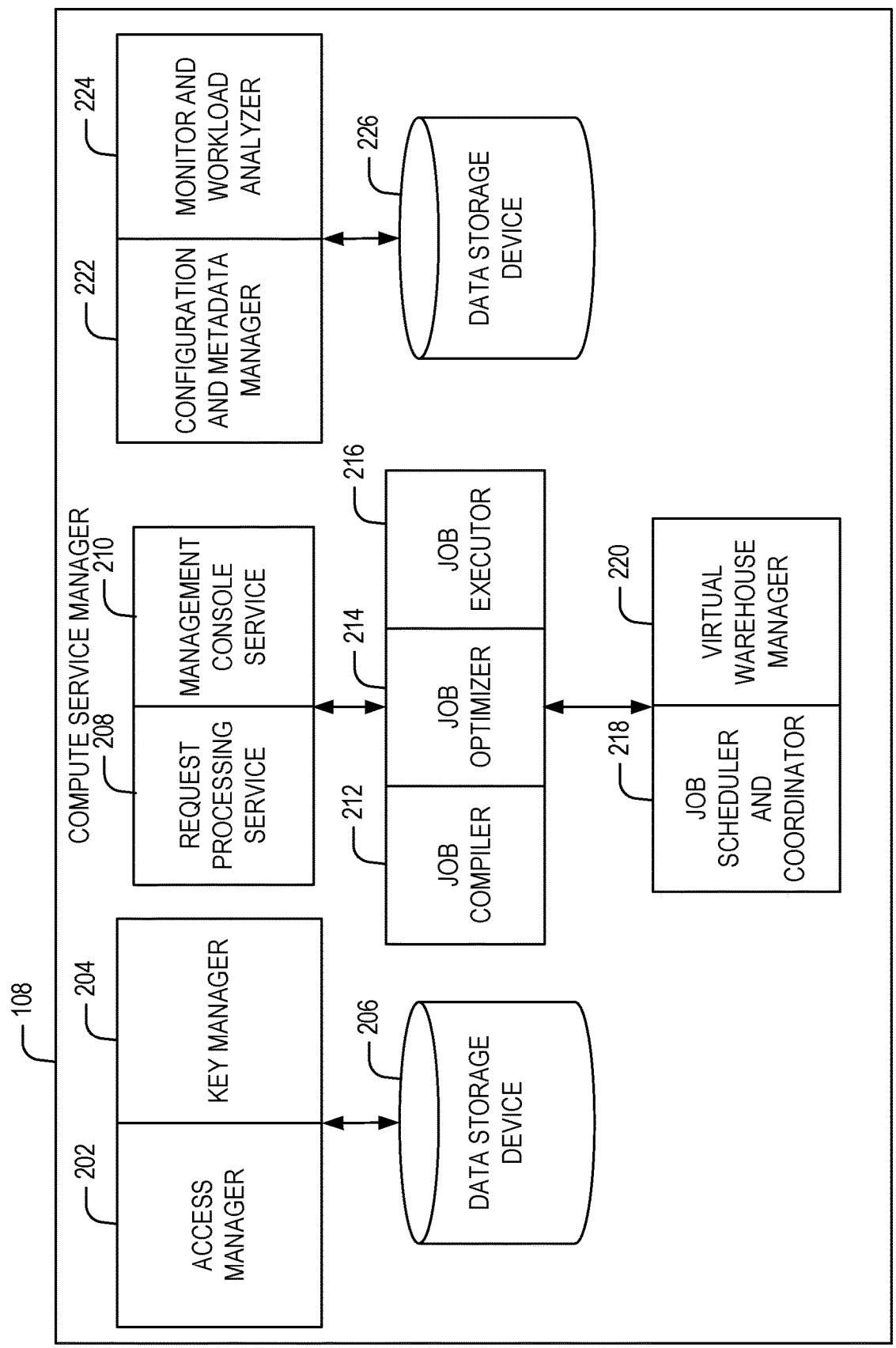
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110, any one of which may be configured (e.g., by the virtual warehouse manager 220) to include any one or more of a table scan operator and a top k operator. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage unites need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in storage platform 104, or any other storage device.

Figure 3:
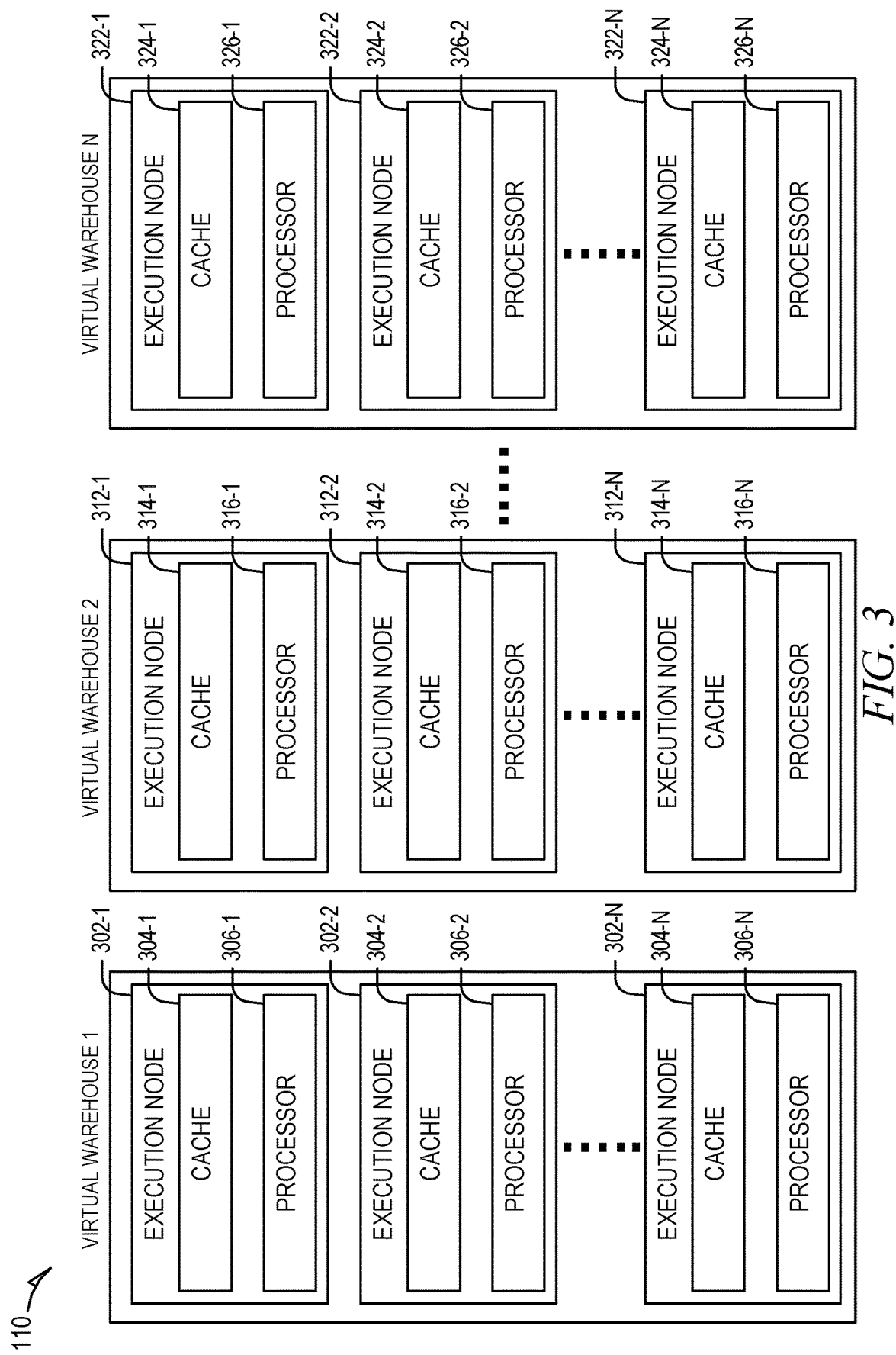
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each includes a data cache and a processor. The virtual warehouses can execute multiple tasks in parallel by using the multiple execution nodes. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

As noted above, table scan operators and top K operators are utilized in processing top K queries. Any one or more of the execution nodes of the execution platform 110 may be configured to be or include one or more table scan operators and/or one or more top K operators. Accordingly, a table scan operator and a top K operator may execute on different threads of an execution node, within different threads of the same execution node, or on different execution nodes. Further details regarding the operation of the table scan operator and the top K operator are discussed below.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, execution nodes access data from the caches, which is significantly faster and avoids the bottleneck problem discussed above. In some embodiments, the caches are implemented using high-speed memory devices that provide fast access to the cached data. Each cache can store data from any of the storage devices in the storage platform 104.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

The execution platform 110 may include any number of virtual warehouses. Additionally, the number of virtual warehouses in the execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
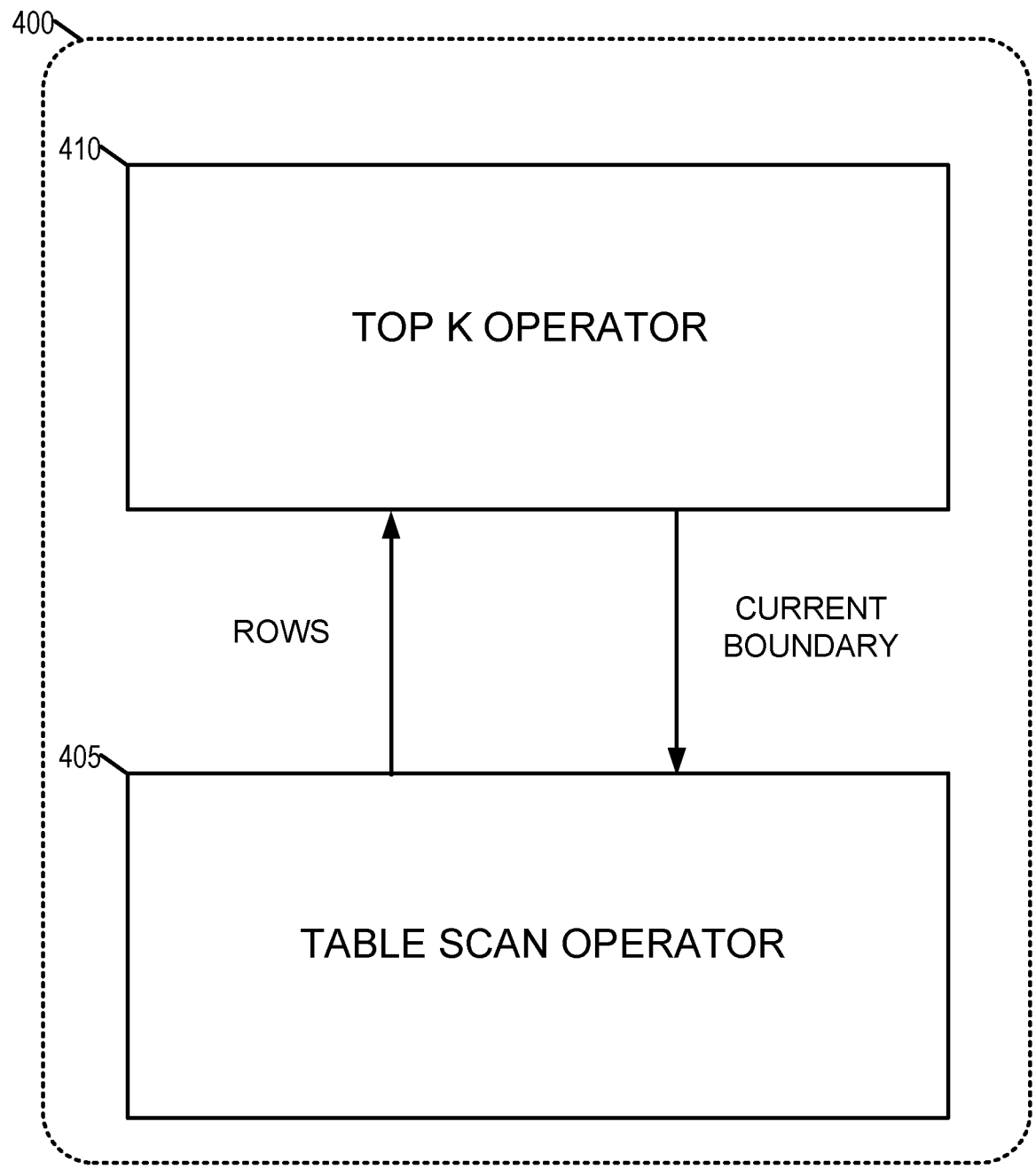
FIG. 4 is a block diagram illustrating a graphical representation of an example query plan used by the cloud data platform to process a top K query, in accordance with some embodiments of the present disclosure.

FIG. 4 is a block diagram illustrating a graphical representation of an example query plan 400 used by the data platform 102 to process a top K query, in accordance with some embodiments of the present disclosure. The query plan 400 is generated (e.g., by the execution platform 110) based on an incoming top K query directed at a table (e.g., stored in the storage platform 104). The top K query includes a first clause to sort the result set in ascending or descending order (e.g., an ORDER BY clause). The first clause further specifies one or more columns to sort and in some instances the first clause may specify that multiple columns are to be sorted in different directions. The top K query further includes a second clause that limits the number of results in the result set (e.g., a LIMIT clause) to K. Hence, a "top K query" specifies that the result set includes a specific number of results in ascending or descending order. An example top K query is as follows:

select *
    from sales
    order by timestamp desc
    limit 5;

In this example top K query, K is 5.

As shown, the query plan 400 includes a table scan operator 405 and a top K operator 410. The query plan 400 may be embodied in computer-readable instructions for execution by one or more hardware components (e.g., one or more processors) such as one or more execution nodes of the execution platform 110. That is, the computer-readable instructions may configure any one or more of the execution nodes of the execution platform 110 to be or include any one or more of the table scan operator 405 and the top K operator 410. The table scan operator 405 and the top K operator 410 may, for example, execute on different threads of the same execution node. Though the execution of the query plan 400 may be depicted and described in a certain order, the order in which the described operations of the operators are performed may vary among embodiments, including performing certain operations in parallel or performing sets of operations in separate processes.

The table scan operator 405 scans the table to which the top K query is directed to identify rows that may satisfy the top K query and the table scan operator 405 provides the identified rows to the top K operator 410, as shown. For some embodiments, the table scan operator 405 may scan only a scan set that includes one or more portions of the table rather than scanning the entire table. An initial scan set may be predetermined and provided to the table scan operator 405 as part of the query plan 400 or the table scan operator 405 may determine or refine the scan set based on the query plan 400. The one or more portions of the table may correspond to one or more storage units of the table. That is, the table may be divided into multiple storage units (e.g., partitions or micro-partitions) and the scan set may comprise a set of storage units corresponding to a subset of the multiple storage units into which the table is divided.

The top K operator 410 is responsible for sorting and filtering rows received from the table scan operator 405 in accordance with the first and second clauses in the top K query. That is, the top K operator 410 is responsible for sorting rows in ascending or descending order based on one or more order-by keys in the top K query and filtering the sorted rows such that only K number of rows are returned in the result set. In some instances, the top K operator 410 sorts rows based on multiple keys (e.g., columns) in opposing directions.

The top K operator 410 sorts and filters rows identified by the table scan operator 405 as they are received. In doing so, the top K operator 410 determines a current boundary that is used to filter out incoming rows. The current boundary may comprise one or more boundary values depending on the query. That is, the current boundary may comprise a single boundary value in instances in which the top K query includes a single order-by key and in instances in which the top K query includes multiple order-by keys, the current boundary may comprise multiple boundary values. The top K operator 410 determines and continuously updates the current boundary based on the sorting and filtering of rows.

The top K operator 410 can determine the current boundary upon receiving, sorting, and filtering at least K rows from the table scan operator 405. The top K operator 410 can determine a boundary value of the current boundary by identifying an extrema value (a minimum or maximum value) from K rows received from the table scan operator 405. Whether the top K operator 410 identifies the maximum or minimum value as the boundary value depends on the ordering specified by the first clause. For example, if the first clause specifies ascending order, the top K operator 410 identifies the maximum value in the set as the boundary value and if the first clause specifies descending order, the top K operator 410 identifies the minimum value as the boundary value.

In general, the top K operator 410 uses the current boundary to establish a boundary constraint for determining whether an incoming row is to be discarded or included as part of a result set provided by the top K operator 410. To determine whether an incoming row received from the table scan operator 405 satisfies the boundary constraint, the top K operator 410 compares one or more values from the incoming row to the current boundary. As an example in which the current boundary includes a single boundary value, if the first clause specifies ascending order, the top K operator 410 discards an incoming row received from the table scan operator 405 if the value in the row is equal to or greater than the boundary value. Otherwise, the row satisfies the boundary constraint and the top K operator 410 includes the incoming row as part of the possible result set and updates the boundary value based on the inclusion of the incoming row.

As another example where the current boundary includes a single boundary value, if the first clause specifies descending order, the top K operator 410 discards an incoming row received from the table scan operator 405 if the value in the row is equal to or less than the boundary value. Otherwise, the row satisfies the boundary constraint and the top K operator 410 includes the incoming row as part of the possible result set and updates the boundary value based on the inclusion of the incoming row.

In an example in which the top K query specifies multiple order-by keys (and the current boundary includes multiple boundary values), top K operator 410 discards all rows that would come behind the current boundary in the ordering specified by the order-by keys.

As shown, the top K operator 410 provides the current boundary to the table scan operator 405 while the table scan operator 405 continues to scan the scan set. The table scan operator 405 uses the current boundary to prune the scan set and filter rows before sending them to the top K operator 410. In pruning the scan set, the table scan operator 405 compares the current boundary to metadata that includes information about the table such as minimum and maximum values stored by certain portions of the table. For example, the multiple storage units into which the table is divided may be distributed among multiple blocks and the metadata may indicate a minimum and maximum value stored by each block, each storage unit, and/or other more or less granular portions of the table. In pruning the scan set using the current boundary, the top K operator 410 discards one or more portions of the table (e.g., blocks or more granular storage units) from the scan set that are determined to not store any values that may be included in the result set based on the metadata and the current boundary (e.g., the portion of the table does not store any values that would satisfy the boundary constraint). The table scan operator 405 may further use the current boundary to eliminate rows identified based on the table scan of the prune set that do not satisfy the boundary constraint established by the current boundary.

As additional rows are received, the top K operator 410 continues to update the current boundary (e.g., by determining updated boundary values) and provide the updated current boundary to the table scan operator 405, and the table scan operator 405, in turn, continues to prune the scan set using updated current boundary and filter rows identified from the table scan.

For some embodiments, the table scan operator 405 may sort the scan set based on the metadata about the table prior to initiating the scan. For example, the table scan operator may use the information about minimum and maximum values stored by each portion of the table to sort the portions of the table specified in the scan set. Whether the table scan operator sorts the scan set in ascending or descending order is based on whether the top K query specifies that results are to be ordered in ascending or descending order. For example, if the top K query specifies an ascending order, the table scan operator can scan the files with the lowest values first to allow the top K operator to determine an initial current boundary that is more selective.

Depending on the embodiment, the query plan 400 may include additional upstream, downstream, or intervening operators not shown. For example, the query plan 400 may include a second top K operator that is downstream from the top K operator 410. Consistent with these embodiments, a downstream top K operator can collect the output of multiple top K operators (e.g., from different threads and/or machines) to ensure only the top K values are actually returned.

For some embodiments, in which multiple top K operators are used to process a top K query in parallel, top K operators may utilize a gossip-based synchronization protocol to exchange current boundary information. With the gossip-based approach, each top K operator transmits its current boundary to one or more other top K operators chosen at random at a predetermined frequency while the query is being processed. Upon receiving current boundary information from the first top K operator, a second top K operator may update its current boundary based on the received information and subsequently transmit this information to one or more other top K operators chosen at random. In this manner, the current boundary is quickly propagated throughout multiple top K operators processing the query.

For some embodiments, top K operators may utilize a central-coordinator-based synchronization protocol. With the central coordinator approach, a single top K operator is responsible for maintaining a global current boundary based on local current boundaries of other top K operators. That is, one or more other top K operators processing the query provide current boundary information to the single coordinator top K operator.

Figure 5:
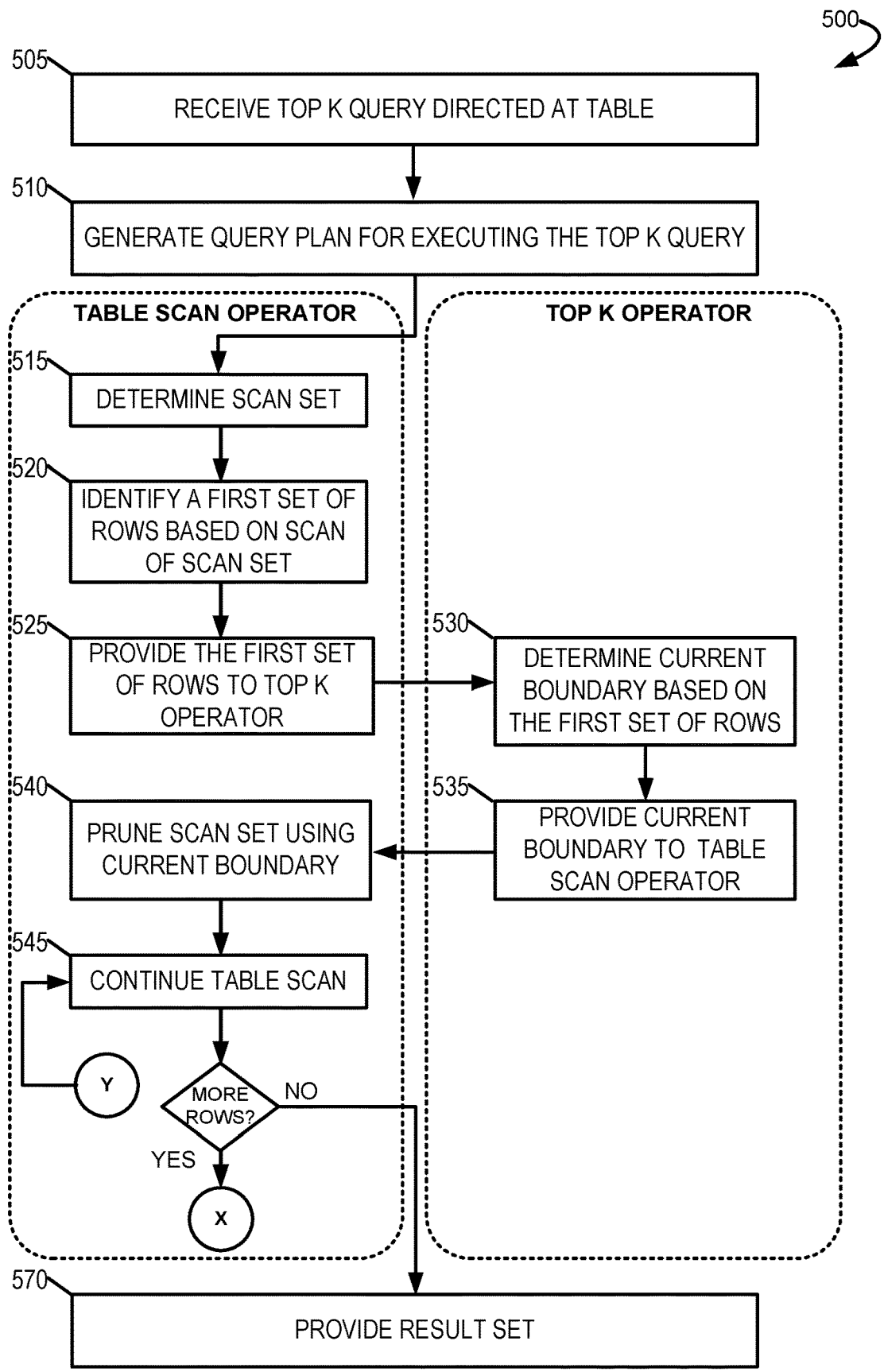
FIGS. 5-7 are flow diagrams illustrating operations of the cloud data platform in performing a method for processing a top K query, in accordance with some embodiments of the present disclosure.
Figure 6:
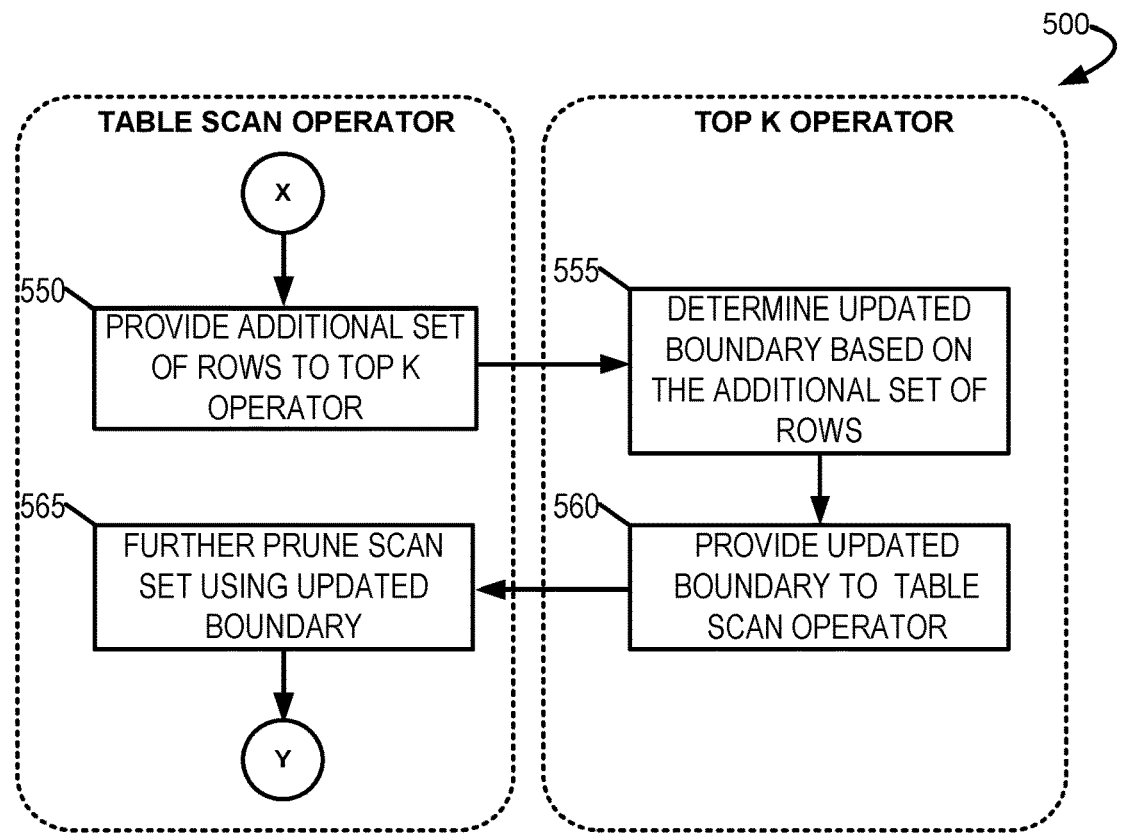
Figure 7:
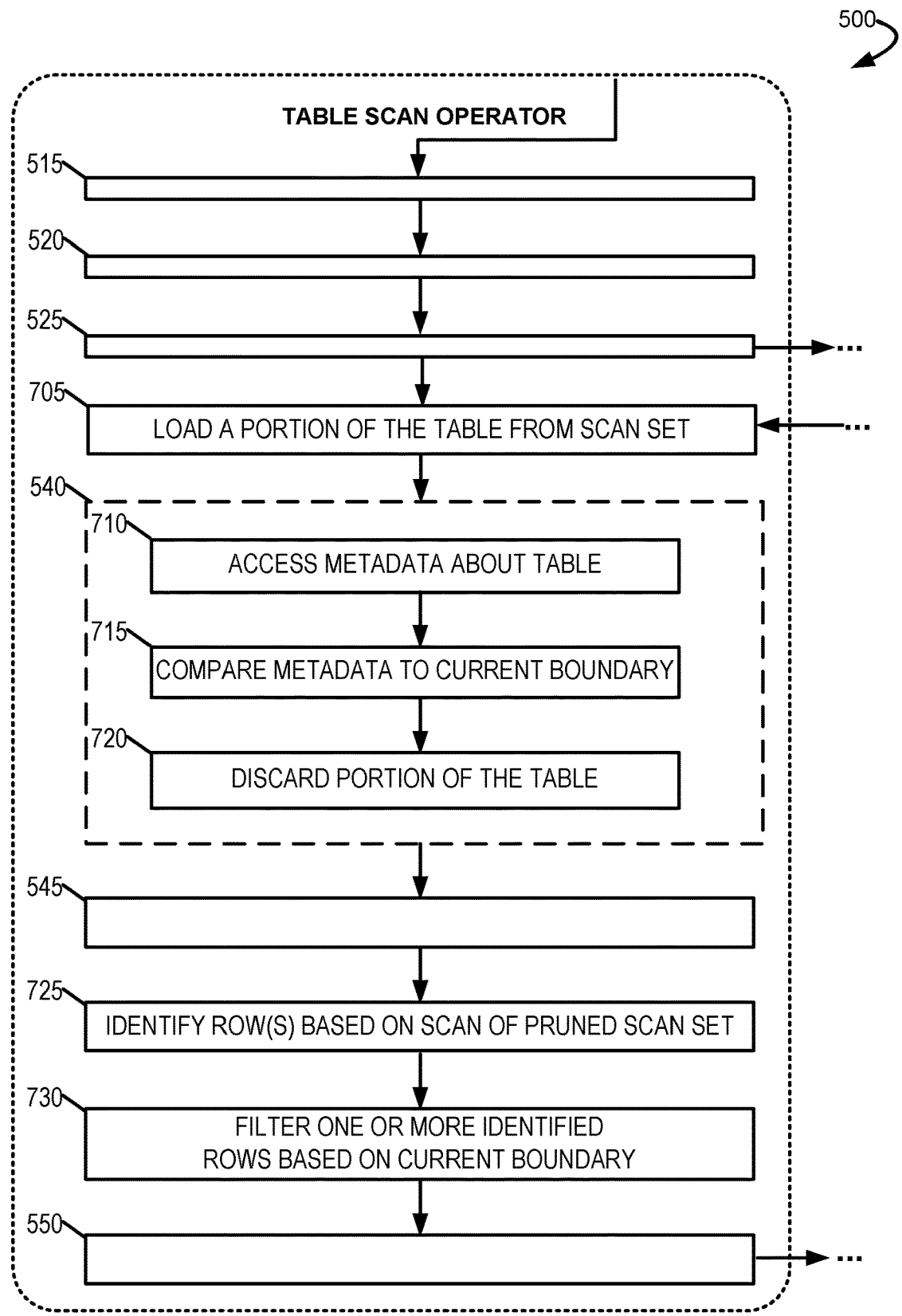

FIGS. 5-7 are flow diagrams illustrating operations of the cloud data platform in performing a method 500 for processing a top K query, in accordance with some embodiments of the present disclosure. The method 500 may be embodied in computer-readable instructions for execution by one or more hardware components (e.g., one or more processors) such that the operations of the method 500 may be performed by components of data platform 102. Accordingly, the method 500 is described below, by way of example with reference thereto. However, it shall be appreciated that the method 500 may be deployed on various other hardware configurations and is not intended to be limited to deployment within the data platform 102.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel or performing sets of operations in separate processes or separate threads.

At operation 505, the data platform 102 receives a top K query directed at a table. The table is organized into multiple storage units (e.g., multiple partitions). The top K query includes a first clause to sort the result set in ascending or descending order (e.g., an ORDER BY clause) and a second clause that specifies a limit on the number of results in the result set (e.g., a LIMIT clause). Hence, a "top K query" specifies that the result set includes a specific number of results in ascending or descending order.

At operation 510, the execution platform 110 generates a query plan for executing the query. The query plan comprises a set of instructions for executing the top K query on the table. The execution platform 110 may generate the query plan based on an execution plan generated by the compute service manager 108. The execution plan specifies one or more files (e.g., comprising one or more portions of the table) and one or more actions to perform to process the query. The query plan comprises at least a table scan operator and a top K operator.

At operation 515, the table scan operator determines a scan set to scan for data that satisfies the top K query. The scan set includes one or more portions of the tables. For example, the scan set may be a subset of the storage units from the table (e.g., one or more storage units). For some embodiments, the determining of the scan set may be performed as part of generating the query plan.

At operation 520, a table scan operator (e.g., table scan operator 405) of the data platform 102 identifies a first set of rows from the table based on the top K query by scanning a portion of the scan set. The table scan operator, at operation 525, provides the first set of rows to a top K operator of the data platform 102 (e.g., top K operator 410) while continuing to scan. The first set of rows include K rows.

At operation 530, the top K operator determines a current boundary based on the first set of rows. The current boundary may comprise one or more boundary values. Accordingly, the determining of the current boundary may include determining a boundary value from the first set of rows. The top K operator can determine a boundary value by identifying an extrema value (e.g., a minimum or maximum value) from the first set of rows. Depending on the ordering specified by the first clause (e.g., ascending or descending order), the top K operator may identify the maximum value or the minimum value as the boundary value. In instances in which multiple top K operators are used to process a top K query, the top K operator may determine the current boundary based on current boundary information received from another top K operator, in some embodiments.

At operation 535, the top K operator provides the current boundary to the table scan operator. In turn, the table scan node uses the current boundary to prune the scan set, at operation 540. For some embodiments, the table scan node loads a portion of the table (e.g., one or more files, blocks, or storage units), checks the portion of the table against the current boundary, and either discards the portion of the table based on the check or scans the portion based on the check.

For some embodiments, in pruning the scan set, the table scan node identifies one or more portions from the scan set to prune based on the current boundary and removes one or more portions of the table (e.g., one or more storage units such as one or more partitions, or one or more rows) from the scan set thereby avoiding a scan of the one or more portions. In this way, the pruning of the scan set can result in a pruned scan set.

As will be discussed in further detail below, the table scan node may prune the one or more portions from the scan set based on a comparison of the boundary value to metadata associated with the table. The table scan operator continues to scan the scan set to identify rows that may satisfy the query (operation 545).

As shown in FIG. 6, the table scan operator may identify an additional set of rows (e.g., a second set of rows) from the table based on a scan of at least a portion of the reduced scan set and provide the additional set of rows to the top K operator, at operation 550. The top K operator, at operation 555, determines an updated boundary based on the additional set of rows, and provides the updated boundary to the table scan operator, at operation 560. In determining the updated boundary, the top K operator determines an updated boundary value. The updated boundary value corresponds to a new extrema value from the additional set of rows. Hence, the top K operator determines the updated boundary value based on the extrema value in the additional set of rows.

The table scan operator uses the updated boundary value to further prune the scan set, at operation 565 (e.g., by removing one or more portions of the table from the reduced scan set). Upon further pruning of the reduced scan set, the method 500 returns to operation 545 where the table scan operator continues to scan the reduced scan set to identify additional rows (e.g., a third set of rows) that may satisfy the query.

If the table scan operator does not identify any further rows at operation 545, the method may proceed to operation 570 (shown in FIG. 5) where the data platform 102 provides the result set responsive to the top K query. The result set includes one or more rows identified from the table that satisfy the top K query. The one or more rows may be based on rows identified by the table scan operator, and processed by the top K operator as well as any other downstream nodes that provide processing in accordance with the top K query.

For some embodiments, the table scan operator may sort the scan set based on metadata about the table prior to initiating the scan. For example, as noted above, the data platform 102 maintains metadata about tables including information that specifies minimum and maximum values stored by specific portions (e.g., specific storage units or storage unit groupings) and the table scan operator may use the information about minimum and maximum values to sort the portions of the table specified in the scan set. In a more specific example, the scan set may comprise a set of micro-partitions and the metadata may specify minimum and maximum values stored by each micro-partition. In this more specific example, the table scan operator may sort micro-partitions in the scan set based on the minimum or maximum values stored by the micro-partitions. Whether the table scan operator sorts the scan set in ascending or descending order is based on whether the top K query specifies that results are to be ordered in ascending or descending order. Sorting the scan set in this manner allows for the top K operator to arrive at a more selective boundary value more quickly. For example, if the top K query specifies a descending order, the table scan operator can scan the files with the highest values first to allow the top K operator to determine an initial boundary value that is more selective.

As shown in FIG. 7, the method 500 may, in some embodiments, further include operation 705. As shown, for some embodiments, the operation 705 may be performed prior to or as part of operation 530 where the top K operator determines the boundary value.

As shown in FIG. 7, the method 500 may, in some embodiments, further include operations 705, 710, 715, 720, 725, and 730. Consistent with these embodiments, the operation 705 may be performed prior to operation 540, where the table scan operator prunes the scan set. At operation 705, the table scan operator loads a portion of the table (e.g., a storage unit or grouping of storage units).

As shown, for some embodiments, the operations 710, 715, and 720 can be performed as part of the operation 540 where the table scan operator prunes the scan set. For some embodiments, the operations 710, 715, and 720 may also or alternatively be performed prior to or as part of operation 565 where the table scan operator further prunes the scan set based on the updated value.

At operation 710, the table scan operator accesses metadata about the table. The metadata may, for example, be maintained in the database 114 of the data platform 102. The metadata includes information about the table such as minimum and maximum values stored in particular portions of the table. For example, as noted above, the table is organized into multiple storage units (e.g., partitions) and the multiple storage units may be stored across multiple blocks. That is, a block may comprise a set of storage units, which may be a subset of the multiple storage units into which the table is organized. The metadata associated with the table may specify a minimum and maximum value for each storage unit as well as each block.

At operation 715, the table scan operator compares the metadata about the portion of the table to the current boundary. In particular, the table scan operator compares the current boundary (or updated boundary) to an extrema value (e.g., a minimum or maximum value) stored by the portion of the table as indicated by the metadata. At operation 720, the table scan operator discards the portion of the table based on the comparison. The portion of the table may correspond to a grouping of storage units (e.g., a file or a block), a storage unit of the table, or a row of the table, for example. Thus, in pruning the scan set, the table scan operator may discard one or more files, blocks, partitions, micro-partitions, or one or more rows from the scan set thereby resulting in a reduced scan set.

Whether the table scan operator compares the current boundary to the maximum value or the minimum value is based on the ordering specified by the first clause of the top K query. As an example, if the first clause specifies that the result set is to be sorted in ascending order, the table scan compares a boundary value of the current boundary to a minimum value stored by the portion of the table, and if the minimum value exceeds the boundary value, the table scan operator discards the portion of the table from the scan set. As another example, if the first clause specifies that the result set is to be sorted in descending order, the table scan compares a boundary value of the current boundary to a maximum value stored by the portion of the table, and if the maximum value does not exceed the boundary value, the table scan operator removes the portion of the table from the scan set.

Consistent with these embodiments, the operations 725 and 730 may be performed prior to the operation 550 where the table scan operator provides the additional set of rows (e.g., a second set of rows) to the top K operator. At operation 725, the table scan operator identifies rows (e.g., a third set of rows) that may satisfy the query by scanning the reduced scan set. The additional set of rows (e.g., a second set of rows) may be a subset of the rows identified at operation 730 (e.g., the second set of rows may be a subset of a third set of rows identified at operation 725).

At operation 730, the table scan operator filters the rows based on the current boundary and the additional set of rows is produced as a result. In filtering the rows, the table scan operator removes one or more rows based on a comparison with the current boundary. In an example, if the first clause of the top K query specifies that the result set is to be sorted in ascending order on a single column, the table scan operator may filter the rows by excluding one or more rows from the additional set of rows that exceed the boundary value of the current boundary. In another example, if the first clause of the top K query specifies that the result set is to be sorted in descending order, the table scan operator may filter the rows by excluding one or more rows from the additional set of rows that do not exceed the boundary value.

Figure 8:
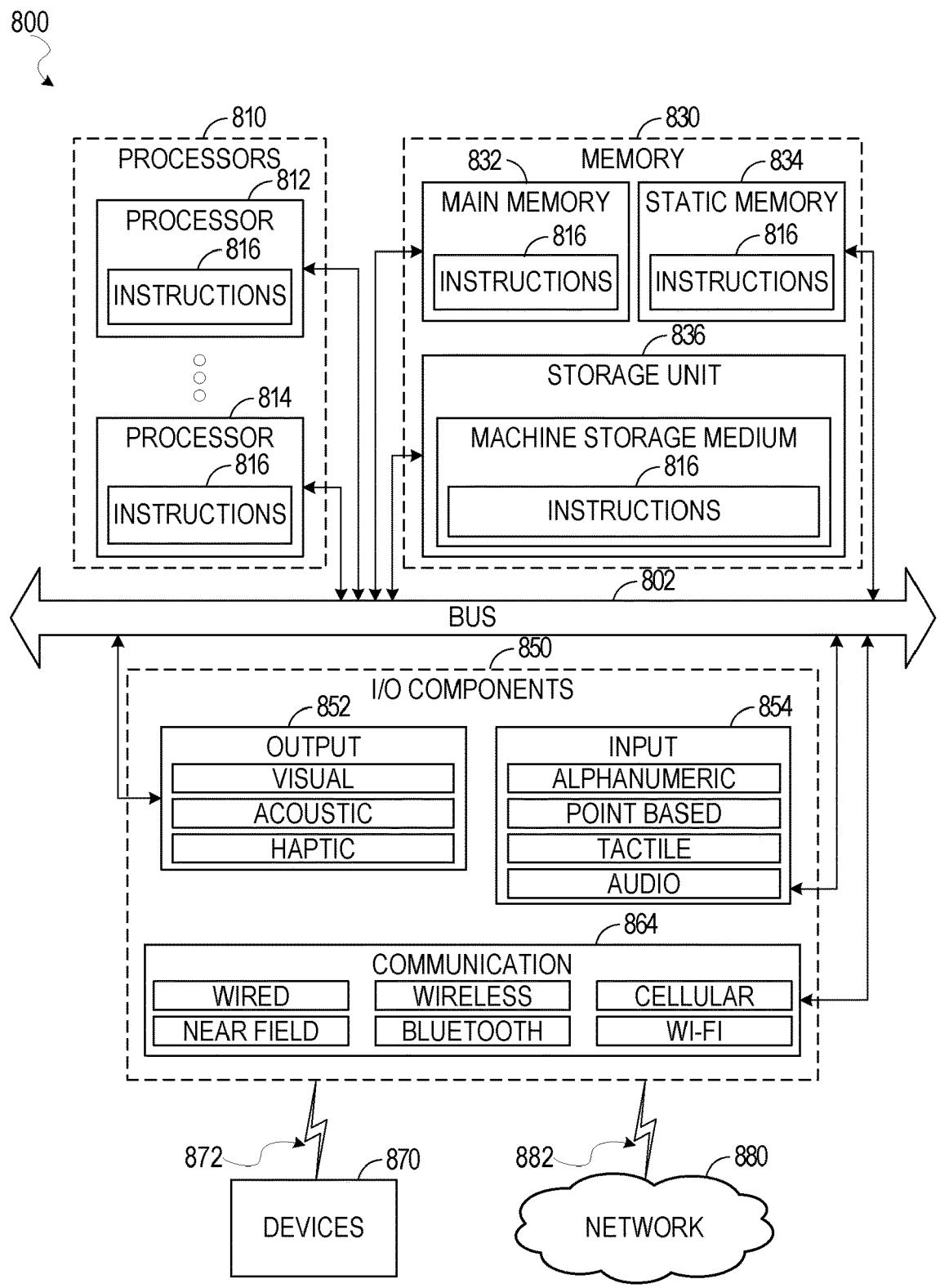
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., a software, a program, an application, an applet, an app, or other executable code) for causing the machine 800 to perform any one or more of the methodologies discussed herein may be executed. For example, the instructions 816 may cause the machine 800 to execute any one or more operations of the method 500. As another example, the instructions 816 may cause the machine 800 to implement portions of the functionality illustrated in any one of FIGS. 1-4. In this way, the instructions 816 transform a general, non-programmed machine into a particular machine that is specially configured to carry out any one of the described and illustrated functions of the data platform 102 such as the compute service manager 108 (or a component thereof) or an execution node of the execution platform 110.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 814 and a processor 812 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include the data storage device 206 or any other computing device described herein as being in communication with the data platform 102 or the storage platform 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving a top K query directed at a table organized into multiple storage units, the top K query comprising a first clause to sort a result set in an order and a second clause that specifies that the result set is limited to a specific number of rows from the table;
   identifying, by a table scan operator, a first set of rows from the table based on a scan set determined for the table based on the top K query, the scan set comprising one or more storage units from among the multiple storage units, the first set of rows having the specific number of rows;
   providing, by the table scan operator, the first set of rows to a top K operator;
   determining, by the top K operator, a current boundary based on the first set of rows;
   providing, by the top K operator, the current boundary to the table scan operator;
   pruning, by the table scan operator, the scan set based on the current boundary; and
   identifying, by the table scan operator, a second set of rows from the table based on the pruning of the scan set; and
   providing a result set responsive to the top K query based on the first and second set of rows, the result set being limited to the specific number of rows specified by the second clause of the top K query.

2. The method of claim 1, further comprising:
   providing, by the table scan operator, the second set of rows to the top K operator;
   identifying, by the top K operator, an updated boundary based on the second set of rows;
   providing, by the top K operator, the updated boundary to the table scan operator; and
   pruning, by the table scan operator, the scan set further based on the updated boundary.

3. The method of claim 1, wherein the determining of the current boundary comprises identifying an extrema value from the first set of rows.

4. The method of claim 1, wherein the operations comprise:
   sorting, by the table scan operator, the scan set in ascending or descending order based on the first clause of the top K query.

5. The method of claim 1, further comprising loading, by the table scan operator, a portion of the table.

6. The method of claim 5, wherein the pruning of the scan set comprises:
   accessing metadata associated with the portion of the table; and
   discarding the portion based on the metadata and the current boundary.

7. The method of claim 6, wherein:
   the metadata specifies an extrema value stored in the portion of the table;
   the current boundary comprises a boundary value; and
   the pruning of the scan set further comprises:
   performing a comparison of the boundary value to the extrema value; and
   discarding the portion of the table based on the comparison.

8. The method of claim 7, wherein:
   the portion of the table comprises a storage unit from among the multiple storage units of the table; and
   discarding the portion of the table from the scan set comprises discarding the storage unit.

9. The method of claim 7, wherein the identifying, by the table scan operator, of the second set of rows comprises:
   identifying a third set of rows based on the pruning of the scan set; and
   filtering the third set of rows by removing one or more rows from the third set of rows based on the current boundary, the filtering of the third set of rows resulting in the second set of rows.

10. The method of claim 1, wherein:
    the first clause comprises an ORDER BY clause in structured query language (SQL); and
    the second clause comprises a LIMIT clause in SQL.

11. A system comprising:
    at least one hardware processor; and
    at least one memory storing instructions that cause the at least one hardware processor to perform operations comprising:
    receiving a top K query directed at a table organized into multiple storage units, the top K query comprising a first clause to sort a result set in an order and a second clause that specifies that the result set is limited to a specific number of rows from the table;
    identifying, by a table scan operator, a first set of rows from the table based on a scan set determined for the table based on the top K query, the scan set comprising one or more storage units from among the multiple storage units, the first set of rows having the specific number of rows;
    providing, by the table scan operator, the first set of rows to a top K operator;
    determining, by the top K operator, a current boundary based on the first set of rows;
    providing, by the top K operator, the current boundary to the table scan operator;
    pruning, by the table scan operator, the scan set based on the current boundary;
    identifying, by the table scan operator, a second set of rows from the table based on the pruning of the scan set; and
    providing a result set responsive to the top K query based on the first and second set of rows, the result set being limited to the specific number of rows specified by the second clause of the top K query.

12. The system of claim 11, wherein the operations further comprise:
    providing, by the table scan operator, the second set of rows to the top K operator;

identifying, by the top K operator, an updated boundary based on the second set of rows;
providing, by the top K operator, the updated boundary to the table scan operator; and
pruning, by the table scan operator, the scan set further based on the updated boundary.

13. The system of claim 11, wherein the determining of the current boundary comprises identifying an extrema value from the first set of rows.

14. The system of claim 11, wherein the operations comprise:
sorting, by the table scan operator, the scan set in ascending or descending order based on the first clause of the top K query.

15. The system of claim 11, wherein the operations further comprise loading, by the table scan operator, a portion of the table.

16. The system of claim 15, wherein the pruning of the scan set comprises:
accessing metadata associated with the portion of the table; and
discarding the portion based on the metadata and the current boundary.

17. The system of claim 16, wherein:
the metadata specifies an extrema value stored in the portion of the table;
the current boundary comprises a boundary value; and
the pruning of the scan set further comprises:
performing a comparison of the boundary value to the extrema value; and
discarding the portion of the table based on the comparison.

18. The system of claim 17, wherein:
the portion of the table comprises a storage unit from among the multiple storage units of the table; and
discarding the portion of the table from the scan set comprises discarding the storage unit.

19. The system of claim 17, wherein the identifying, by the table scan operator, of the second set of rows comprises:
identifying a third set of rows based on the pruning of the scan set; and
filtering the third set of rows by removing one or more rows from the third set of rows based on the current boundary, the filtering of the third set of rows resulting in the second set of rows.

20. The system of claim 11, wherein:
the first clause comprises an ORDER BY clause in structured query language (SQL); and
the second clause comprises a LIMIT clause in SQL.

21. A computer-storage medium comprising instructions that, when executed by one or more processors of a machine, configure the machine to perform operations comprising:
receiving a top K query directed at a table organized into multiple storage units, the top K query comprising a first clause to sort a result set in an order and a second clause that specifies that the result set is limited to a specific number of rows from the table;
identifying, by a table scan operator, a first set of rows from the table based on a scan set determined for the table based on the top K query, the scan set comprising one or more storage units from among the multiple storage units, the first set of rows including the specific number of rows;
providing, by the table scan operator, the first set of rows to a top K operator;
determining, by the top K operator, a current boundary based on the first set of rows;
providing, by the top K operator, the current boundary to the table scan operator;
pruning, by the table scan operator, the scan set based on the current boundary;
identifying, by the table scan operator, a second set of rows from the table based on the pruning of the scan set; and
providing a result set responsive to the top K query based on the first and second set of rows, the result set being limited to the specific number of rows specified by the second clause of the top K query.

22. The computer-storage medium of claim 21, wherein the operations further comprise:
providing, by the table scan operator, the second set of rows to the top K operator;
identifying, by the top K operator, an updated boundary based on the second set of rows;
providing, by the top K operator, the updated boundary to the table scan operator; and
pruning, by the table scan operator, the scan set further based on the updated boundary.

23. The computer-storage medium of claim 21, wherein the determining of the current boundary comprises identifying an extrema value from the first set of rows.

24. The computer-storage medium of claim 21, wherein the operations comprise:
sorting, by the table scan operator, the scan set in ascending or descending order based on the first clause of the top K query.

25. The computer-storage medium of claim 21, wherein the operations further comprise loading, by the table scan operator, a portion of the table.

26. The computer-storage medium of claim 25, wherein the pruning of the scan set comprises:
accessing metadata associated with the portion of the table; and
discarding the portion based on the metadata and the current boundary.

27. The computer-storage medium of claim 26, wherein:
the metadata specifies an extrema value stored in the portion of the table;
the current boundary comprises a boundary value; and
the pruning of the scan set further comprises:
performing a comparison of the boundary value to the extrema value; and
discarding the portion of the table based on the comparison.

28. The computer-storage medium of claim 27, wherein:
the portion of the table comprises a storage unit from among the multiple storage units of the table; and
discarding the portion of the table from the scan set comprises discarding the storage unit.

29. The computer-storage medium of claim 27, wherein the identifying, by the table scan operator, of the second set of rows comprises:
identifying a third set of rows based on the pruning of the scan set; and
filtering the third set of rows by removing one or more rows from the third set of rows based on the current boundary, the filtering of the third set of rows resulting in the second set of rows.

30. The computer-storage medium of claim 21, wherein:
the first clause comprises an ORDER BY clause in structured query language (SQL); and
the second clause comprises a LIMIT clause in SQL.

* * * * *